US006719330B2

(12) United States Patent
Brown et al.

(10) Patent No.: US 6,719,330 B2
(45) Date of Patent: Apr. 13, 2004

(54) FLEXIBLE TUBING/FITTING CONNECTION

(75) Inventors: James T. Brown, Commerce, TX (US); Gary L. Runyan, Plano, TX (US); Robert S. Stachowiak, Commerce, TX (US)

(73) Assignee: Qest, Dallas, TX (US)

( * ) Notice: Subject to any disclaimer, the term of this patent is extended or adjusted under 35 U.S.C. 154(b) by 0 days.

(21) Appl. No.: 10/174,312

(22) Filed: Jun. 18, 2002

(65) Prior Publication Data
US 2003/0230895 A1 Dec. 18, 2003

(51) Int. Cl.[7] ................................................ F16L 33/00
(52) U.S. Cl. ..................... 285/242; 285/239; 285/331
(58) Field of Search ................. 285/340, 921, 285/331, 305, 242, 245, 251, 248, 249, 256, 239

(56) References Cited

U.S. PATENT DOCUMENTS

| 922,805 | A | * | 5/1909 | Nelson et al. | 285/238 |
|---|---|---|---|---|---|
| 2,123,889 | A | * | 7/1938 | Gleason | 285/114 |
| 2,696,394 | A | * | 12/1954 | Kaiser | 285/256 |
| 2,782,060 | A | * | 2/1957 | Appleton | 285/248 |
| 3,007,726 | A | * | 11/1961 | Parkin | 403/372 |
| 3,441,296 | A | * | 4/1969 | Wilkin | 285/256 |
| 3,492,410 | A | * | 1/1970 | Kelly | 174/78 |
| 3,603,912 | A | * | 9/1971 | Kelly | 174/65 SS |
| 3,830,531 | A | * | 8/1974 | Burge | 285/249 |
| 3,840,256 | A | * | 10/1974 | Cox, Jr. | 285/331 |
| 3,976,314 | A | * | 8/1976 | Graham | 285/238 |
| 4,000,918 | A | * | 1/1977 | Reker | 285/248 |
| 4,099,749 | A | * | 7/1978 | van Vliet | 285/398 |
| 4,468,535 | A | * | 8/1984 | Law | 174/65 R |
| 4,679,827 | A | * | 7/1987 | Law | 285/331 |
| 4,865,674 | A | * | 9/1989 | Durkin | 156/158 |
| 5,015,015 | A | * | 5/1991 | Fetters | 285/114 |
| 5,082,315 | A | * | 1/1992 | Sauer | 285/256 |
| 5,388,873 | A | * | 2/1995 | Enayati | 285/256 |
| 5,603,530 | A | * | 2/1997 | Guest | 285/105 |
| 5,681,062 | A | * | 10/1997 | Fukao et al. | 285/340 |
| 6,109,664 | A | * | 8/2000 | Guest | 285/319 |
| 6,231,090 | B1 | * | 5/2001 | Fukao et al. | 285/340 |
| 6,499,771 | B1 | * | 12/2002 | Snyder et al. | 285/319 |

* cited by examiner

Primary Examiner—Eric K. Nicholson
(74) Attorney, Agent, or Firm—Konneker & Smith, P.C.

(57) ABSTRACT

A tubing/fitting connection provides secure sealing attachment of a tubing to a fitting. In a described embodiment, a flexible tubing is connected to a non-rigid fitting using a retainer which grips both the tubing and the fitting. The retainer also internally supports the tubing, and may sealingly engage both the tubing and the fitting.

34 Claims, 4 Drawing Sheets

FLEXIBLE TUBING/FITTING CONNECTION

BACKGROUND

The present invention relates generally to tubing/fitting connections and, in an embodiment described herein, more particularly provides a connection for flexible tubing and fittings made of specific materials.

Tubing/fitting connections are well known in the art, and a variety of such connections have been developed over the years. One common connection for a rigid tubing and fitting is to use a ferrule which slips over the tubing and is secured to the fitting by a nut threaded to the fitting. The ferrule externally grips the tubing, and is sealed between the tubing and fitting, when the nut is tightened onto the fitting.

Another common connection for flexible tubing is to form a tubular barb on the fitting, which may be made of either metal or plastic material. The barb is inserted into the tubing and internally grips the tubing. For elevated pressure applications, a clamp is usually installed about the exterior of the tubing. When the clamp is tightened, the tubing is forced against the exterior of the barb, thereby enhancing the sealing of the tubing to the barb and further securing the tubing to the barb.

Unfortunately, each of these connections has drawbacks and, in particular, is unsuitable for use with crosslinked polyethylene (PEX) tubing and/or fittings. The ferrule and threaded nut connection uses an external clamping force to seal the ferrule to the tubing, but does not internally support the tubing. Where flexible tubing is used, this clamping force will collapse the tubing, unless the tubing is internally supported.

The ferrule and threaded nut connection is very unsuitable for use where both the tubing and fitting are made of PEX. Since PEX has a relatively low modulus, threads formed on a fitting would easily deform, and would also make it difficult to produce a consistent force on the ferrule. In addition, it would be difficult to achieve and maintain a seal between the ferrule and the fitting, and between the ferrule and the tubing. Furthermore, since PEX has a relatively low coefficient of friction, it would be difficult for the ferrule to grip the tubing.

The tubular barb connection also has disadvantages. If the tubing and fitting are made of PEX material, the very low coefficient of friction between the tubing and barb will make it very difficult to secure these parts together at elevated pressures. If the barb is made of any flexible material, such as PEX, it will need to have a relatively thick cross-section to resist the clamping force. This thick cross-section will reduce the flow area through the fitting.

From the foregoing, it can be seen that it would be quite desirable to provide an improved tubing/fitting connection and an improved method of connecting tubings to fittings. These improvements should permit satisfactory use with PEX tubings and fittings, and should be usable with other materials as well.

SUMMARY

In carrying out the principles of the present invention, in accordance with an embodiment thereof, a tubing/fitting connection is provided in which a retainer is used to secure the tubing to the fitting. The retainer may also internally support the tubing. A clamp may be used to enhance the gripping and sealing engagement between the tubing and fitting. In some embodiments, the retainer may also seal the tubing to the fitting.

In broad terms, a tubing/fitting connection is provided which includes a flexible tubing, a non-rigid fitting having a portion thereon for receiving the tubing, and a retainer which grips the tubing and grips the fitting portion, thereby securing the tubing to the fitting portion. Several embodiments of the retainer are provided. The retainer may internally grip both the tubing and the fitting. The retainer may optionally sealingly engage both the tubing and the fitting. The retainer may be a single member, or it may include multiple members.

A method of connecting a flexible tubing to a fitting is also provided, which method includes the steps of inserting a retainer into the crosslinked polyethylene tubing, internally gripping the tubing with at least one first gripping structure of the retainer, internally supporting the tubing with a cylindrical portion of the retainer, inserting the tubing into the fitting, and internally gripping the fitting with at least one second gripping structure of the retainer.

The use of the disclosed connection and method provides reliable, economical, secure and convenient sealing attachment of tubings to fittings, and is especially useful where the tubing and fitting are made of PEX material.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
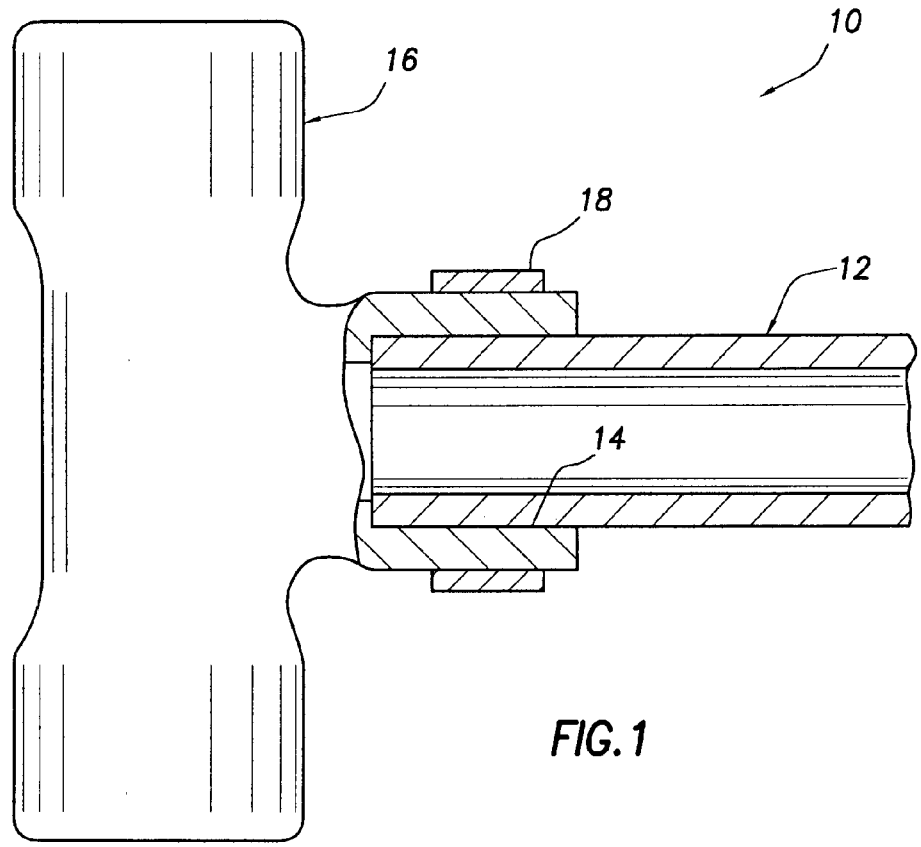
FIG. 1 is a partially cross-sectional view of a tubing/fitting connection.

Representatively illustrated in FIG. 1 is a tubing/fitting connection 10. This connection 10 is used herein to demonstrate some of the difficulties which may be experienced in sealingly attaching PEX tubings to PEX fittings. In the connection 10, a tubing 12 is inserted into a port 14 of a fitting 16. In FIG. 1, the fitting 16 is depicted as a tee for joining three sections of tubing (only one of which is illustrated), but it is to be understood that the term "fitting" as used herein may designate any type of apparatus which is sealingly attached to a tubing, such as a coupling, elbow, cross, cap, plug, etc., and including flow control devices, such as valves, nozzles, etc.

A clamp 18, such as a conventional hose clamp, ring clamp or other type of clamp, is used to squeeze the fitting 16 about the tubing 12. The clamp 18 exerts an inwardly directed radial force on the fitting 16, which causes the fitting to grip the tubing, and effects a seal between the fitting and tubing.

However, if the tubing 12 and/or fitting 16 are made of a PEX material, or certain other flexible or non-rigid materials, the connection 10 will be unsuitable for use at elevated pressures. One problem is that the tubing 12 is internally unsupported. When the clamping force from the clamp 18 is applied, the tubing 12 will displace radially inward, perhaps causing the tubing to collapse, and at a minimum preventing the fitting 16 from effectively gripping the tubing and maintaining a seal therebetween.

Another problem is that PEX and other flexible and non-rigid materials have a relatively low coefficient of friction. This means that it will be very difficult for the fitting 16 to grip the tubing 12 and prevent it from displacing out of the port 14 when pressure is applied to the connection 10. Although gripping structures, such as ridges, teeth, etc., could be formed on the fitting 16 and/or tubing 12 to enhance the grip therebetween, the low modulus of PEX will prevent these from being very effective for extended periods of time.

Figure 2:
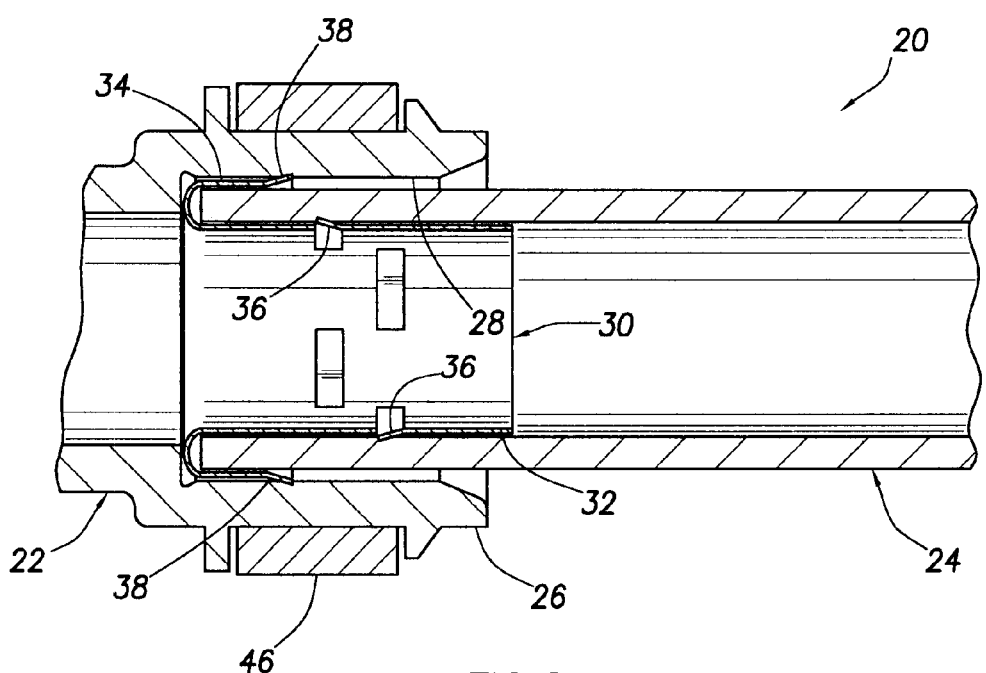
FIG. 2 is a cross-sectional view of a first tubing/fitting connection embodying principles of the present invention.

Turning now to FIG. 2, a tubing/fitting connection 20 which embodies principles of the present invention is representatively illustrated. In the following description of the connection 20 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The connection 20 includes a PEX fitting 22 and a PEX tubing 24. The tubing 24 is received within a portion 26 of the fitting 22 which has a bore 28 internally formed therein somewhat larger than an outer diameter of the tubing. It is to be clearly understood however, that materials other than PEX may be used for the tubing 24 and/or fitting 22, and it is not necessary for the tubing to be received within the fitting, since the fitting could instead be received within the tubing, in keeping with the principles of the present invention.

The connection 20 further includes a retainer 30 which performs multiple functions in the connection. The retainer 30 internally grips the tubing 24 and internally grips the fitting 22, thereby securing the tubing to the fitting, and internally supports the tubing. Due to the unique configuration of the retainer 30 and the method in which it is used, the connection 20 is very economical to produce and use, straightforward in its installation, and reliable in operation.

The retainer 30 includes an inner sleeve 32 and an outer sleeve 34. The inner sleeve 32 is received within the tubing 24 and is a close fit therein, so that the tubing is internally supported. The outer sleeve 34 fits closely about the exterior of the tubing 24 and is received within the bore 28 of the fitting 22.

The inner sleeve 32 has flaps 36 cut therein. The flaps 36 are bent outward somewhat, and their open ends face toward the end of the tubing 24 received in the fitting 22, so that the flaps grip the tubing and resist removal of the retainer 30 from the tubing. Although the flaps 36 are depicted in FIG. 2 as having a rectangular shape, it will be appreciated that may other shapes, such as triangular, semicircular, trapezoidal, etc., may be used instead. If the retainer 30 is made of a sheet metal or thin walled tubing, then the flaps 36 may be formed, for example, by die stamping.

Note that the flaps 36 are shown as only an example of a wide variety of gripping structures which may be used to secure the retainer 30 to the tubing 24. Other gripping structures which may be used include, but are not limited to, grooves formed externally on the inner sleeve 32, knurling formed on the inner sleeve, granular material adhered to the inner sleeve, teeth, ridges or other projections formed on the inner sleeve, etc.

The outer sleeve 34 internally grips the bore 28 using flaps 38 formed thereon. Similar flaps 40 may be seen on the retainer 42 of the connection 44 of FIG. 3. The flaps 38 of the retainer 30 secure the retainer in the fitting 22 and, in conjunction with the flaps 36, prevent removal of the tubing 24 from the fitting. Note that the configurations of the flaps 36, 38 facilitate insertion of the inner sleeve 32 into the tubing 24 and insertion of the outer sleeve 34 into the bore 28, while preventing removal of the retainer 30 from the tubing and fitting 22.

A method of installing the connection 20 would include the steps of inserting the retainer 30 into the tubing 24, inserting the tubing and retainer into the fitting 22, and tightening a clamp 46 about the fitting portion 26. Alternatively, the retainer 30 could be inserted into the bore 28, and then the tubing 24 could be inserted into the bore over the inner sleeve 32. One preferred method is to insert the retainer 30 into the fitting 22, then insert the tubing 24 into the fitting over the retainer, and then tighten the clamp 46.

The retainer 30 may affect a seal with the tubing 24 and/or fitting 22. For example, the inner sleeve 32 may seal against the tubing 24, and the outer sleeve 34 may seal against the bore 28. Alternatively, or in addition, the clamp 46 may squeeze the bore 28 into sealing engagement with the tubing 24. However, it is to be clearly understood that it is not necessary for the retainer 30 to seal against the tubing 24 and/or fitting 22 in keeping with the principles of the invention.

Figure 3:
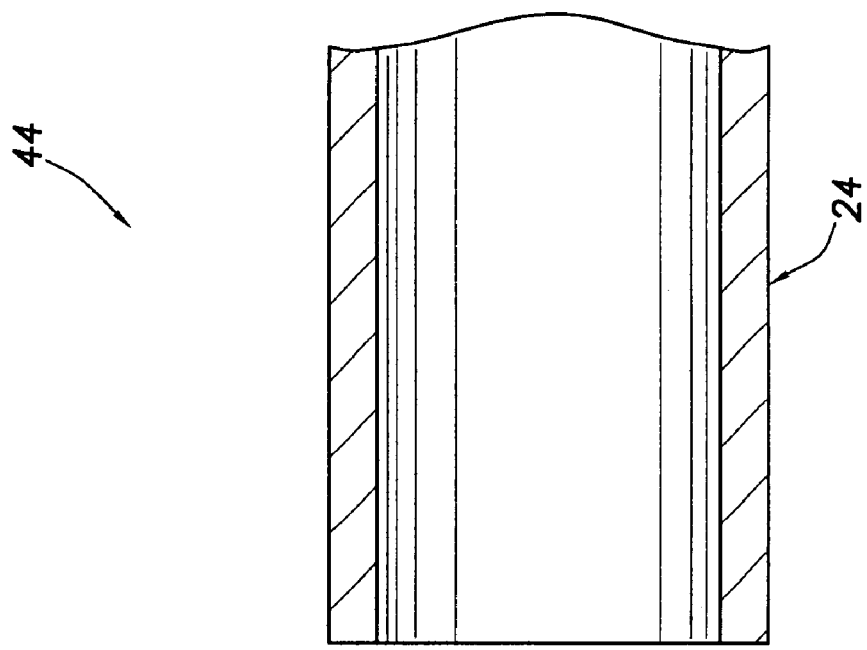
FIG. 3 is a cross-sectional view of a second tubing/fitting connection embodying principles of the present invention.
Figure 3:
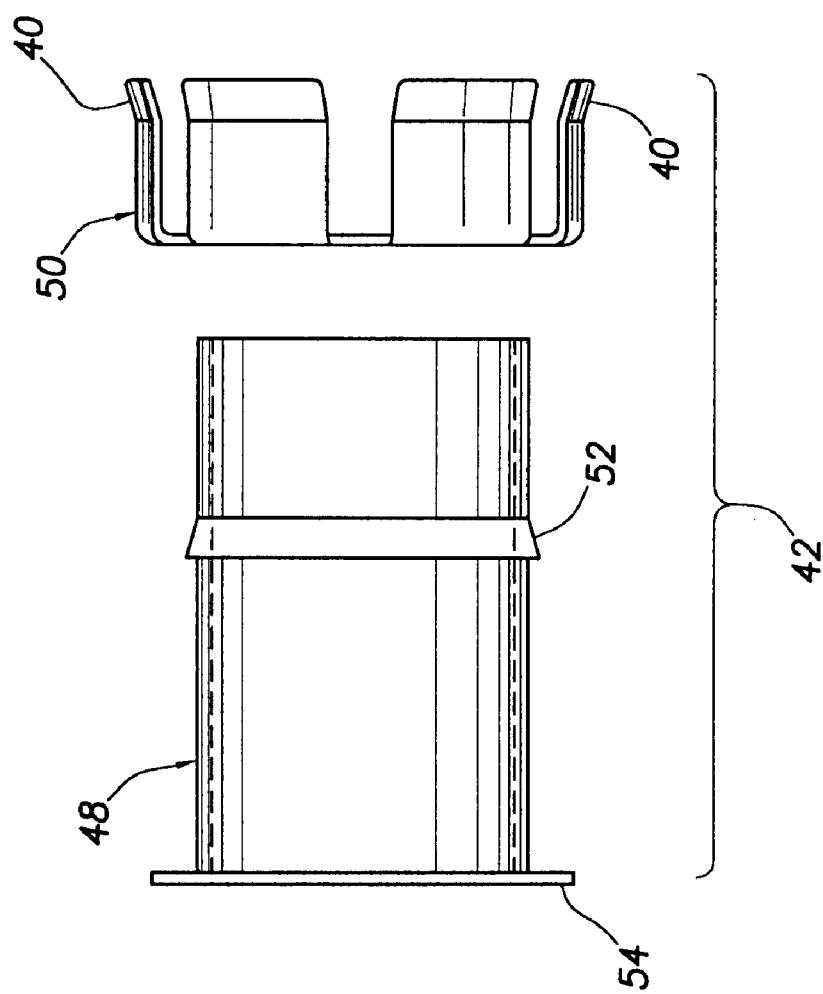

Referring additionally now to FIG. 3, the connection 44 embodying principles of the present invention is representatively illustrated. This connection 44 is similar in many respects to the connection 20 described above. In particular, the connection 44 includes the retainer 42, which in turn includes an inner sleeve 48 for internal gripping engagement with the tubing 24 and an outer sleeve 50 for internal gripping engagement with the fitting 22. For illustrative clarity, the fitting 22 is not shown in FIG. 3, and the retainer 42 and tubing 24 are shown as an exploded assembly.

The retainer 42 differs substantially from the retainer 30 described above in at least two respects. First, the retainer 42 is made up of multiple members which perform separate functions. Second, the inner sleeve 48 includes an externally projecting circumferentially continuous tooth, ridge or ring 52 formed thereon for internally gripping the tubing 24.

The outer sleeve 50 is installed over the end of the tubing 24. The inner sleeve 48 is then inserted through the outer sleeve 50 (via an opening in the end of the outer sleeve not visible in FIG. 3) and into the interior of the tubing 24. A radially enlarged flange 54 on the inner sleeve 48 (having a larger diameter than the opening in the end of the outer sleeve) prevents removal of the outer sleeve 50 from the tubing 24. Thus, the inner sleeve 48 both grips the tubing 24 and retains the outer sleeve 50 relative to the tubing.

After the retainer 42 is installed on the tubing 24, the tubing and retainer are inserted into the fitting 22 as described above. The flaps 40 then secure the retainer 42 and tubing 24 to the fitting 22. Of course, the retainer 42 could first be inserted into the fitting 22 prior to inserting the tubing 24 in the fitting. The clamp 46 is then tightened about the fitting portion 26.

Referring additionally now to FIGS. 4–7, alternative retainers 56, 58, 60, 62 embodying principles of the present invention are representatively illustrated. These retainers 56, 58, 60, 62 demonstrate the wide variety of different retainer configurations which may be used without departing from the principles of the invention. Of course, other configurations may be used as well. For example, although each of the retainers 56, 58, 60, 62 is formed as a single member, multiple members may be used.

The retainer 56 is similar to the retainer 30 of FIG. 1. In particular, the retainer 56 includes an inner sleeve 64 having flaps 66 formed thereon. However, instead of the outer sleeve 34 of the retainer 30, the retainer 56 includes a radially enlarged flange 68 formed thereon. The flange 68 has an outer circumferentially continuous ring-like edge 70 which is closely received in the bore 28 of the fitting 22, and which is prevented from being removed from the bore when the clamp 46 is tightened about the fitting portion 26. Thus, the flaps 66 prevent removal of the retainer 56 from the tubing 24, and the flange 68 prevents removal of the retainer from the fitting 22 when the clamp 46 is tightened.

The retainer 58 is similar to the retainer 56 in that it includes a flange 72 formed thereon to prevent removal of the retainer 58 from the fitting 22. However, in the retainer 58, the flange 72 has an outer ring-like edge 74 which is angled inward to facilitate insertion of the flange into the bore 28. If constructed so that an interference fit exists between the flange 72 and the bore 28, the edge 74 may prevent removal of the retainer 58 from the fitting 22 before the clamp 46 is tightened.

Instead of the flaps 66 of the retainer 56, the retainer 58 includes another, smaller diameter, flange 76 formed thereon. An outer ring-like edge 78 of the flange 76 grippingly engages the tubing 24 when inserted therein. The flange 78 may be an interference fit within the tubing 24, or it may not grip the tubing until the clamp 46 is tightened about the fitting 22.

Since the flanges 72, 76 are circumferentially continuous, they may optionally sealingly engage the tubing 24 and fitting 22 even without use of the clamp 46. Thus, use of the clamp 46 may be unnecessary in low pressure or vacuum applications using the retainer 58 (or other retainers described herein). Note that the flanges 68, 72, 76 may be formed by swaging or otherwise deforming the retainers 56, 58 or by machining the flanges thereon, etc.

Figure 5:
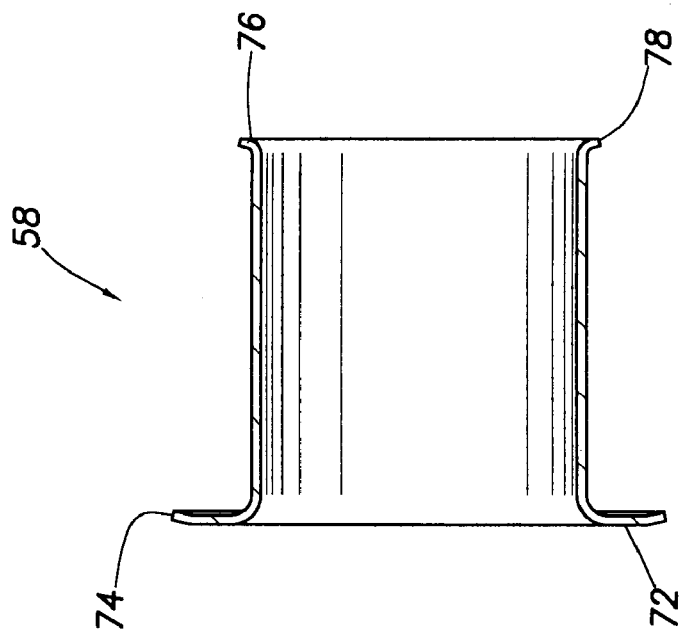
FIG. 5 is a cross-sectional view of a second alternate retainer embodying principles of the present invention.
Figure 4:
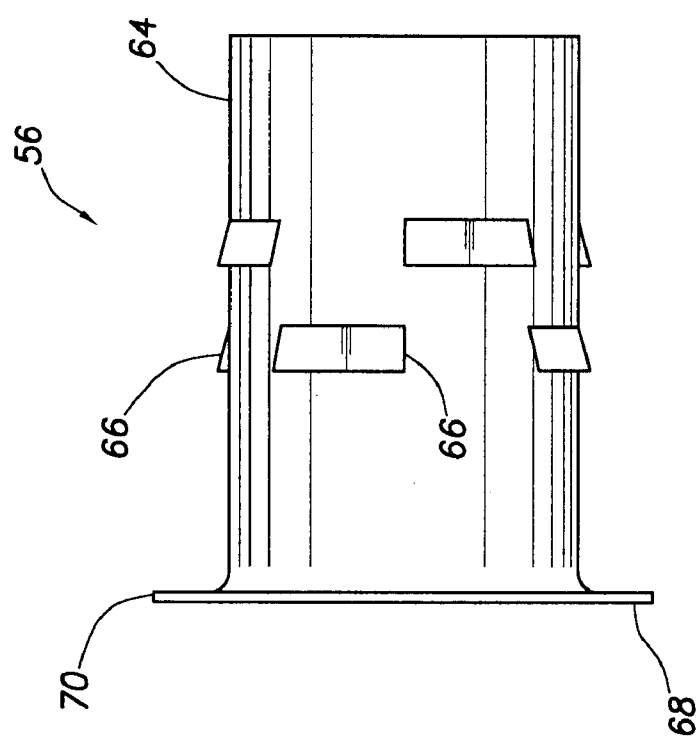
FIG. 4 is an elevational view of a first alternate retainer embodying principles of the present invention.
Figure 6:
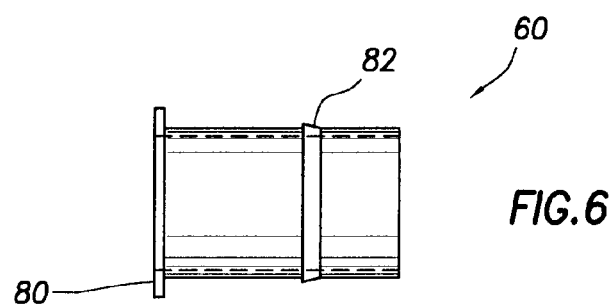
FIG. 6 is an elevational view of a third alternate retainer embodying principles of the present invention.
Figure 7:
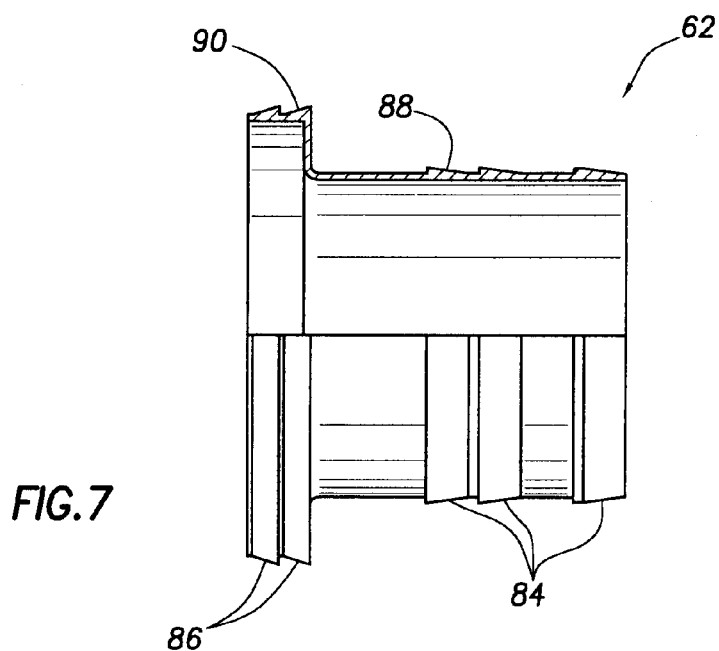
FIG. 7 is a quarter-sectional view of a fourth alternate retainer embodying principles of the present invention.

The retainer 60 combines the benefits of a flange 80 for engagement with the fitting 22, and a tooth, ridge or ring 82 for engagement with the tubing 24. While the retainers 56, 58 are depicted in FIGS. 4 & 5 as being made of deformed thin walled tubing, the retainer 60 is cast or machined from, for example, rigid tubing, etc. Thus, various methods may be used to form retainers in keeping with the principles of the present invention.

The retainer 62 includes multiple teeth, ridges or rings 84, 86 on both an inner sleeve 88 and an outer sleeve go. The rings 84 internally grip the tubing 24, and the rings 86 internally grip the bore 28. The retainer 62 is specifically designed for larger diameter tubing and fittings, where enhanced gripping engagement is needed to resist increased separation forces due to pressure in the tubing/fitting connection.

Figure 8:
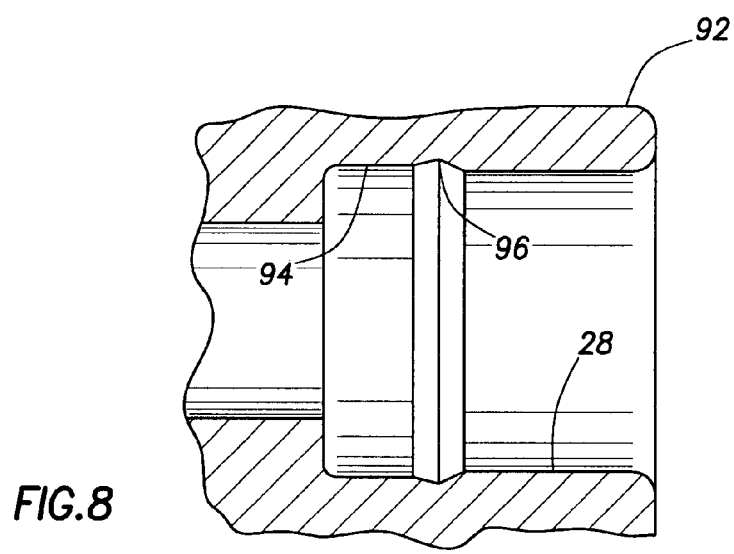
FIG. 8 is a cross-sectional view of an alternate tubing-receiving portion of a fitting embodying principles of the present invention.

Referring additionally now to FIG. 8, an alternative fitting portion 92 embodying principles of the present invention is representatively illustrated. The fitting portion 92 includes the bore 28 similar to the fitting portion 26 described above. However, the fitting portion 92 further includes a bore 94 having a diameter larger than the bore 28, and a radially enlarged recess 96. Note that the recess 96 and enlarged bore 94 could have the same outer diameter, in which case they may merge into a single enlarged recess. Thus, a separate enlarged bore 94 and recess 96 are not necessary in the fitting portion 92.

The bore 94 may be configured to receive the enlarged portions of the various retainers described above. For example, the outer sleeves 34, 50, 90 of the retainers 30, 42, 62 may be received in the bore 94. In addition, the flanges 68, 70, 80 of the retainers 56, 58, 60 may be received in the bore 94.

The recess 96 may be configured to receive or abut any of the gripping structures used to secure the retainers to the fitting. For example, the flaps 38, 40 of the retainers 30, 42, or the rings 86 of the retainer 62, may engage the recess 96. In addition, the flanges 68, 72, 80 may abut the recess 96.

Thus, the tubing-receiving portion 26 of the fitting 22 may be configured so that it provides for enhanced gripping and/or sealing engagement with any of the various retainers 30, 42, 56, 58, 60, 62. Other configurations of retainers, tubings and fittings may also be used, without departing from the principles of the invention.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A tubing/fitting connection, comprising:

a flexible tubing;

a fitting made from a non-rigid material having a portion thereon for receiving the tubing;

a retainer which both internally grips the tubing and internally grips the fitting portion, thereby securing the tubing to the fitting portion; and a clamp which both increases a grip between the retainer and the tubing and increases a grip between the retainer and the fitting.

2. The tubing/fitting connection according to claim 1, wherein the tubing is made of a flexible material.

3. The tubing/fitting connection according to claim 1, wherein the tubing is made of a crosslinked polyethylene material.

4. The tubing/fitting connection according to claim 1, wherein the fitting is made of a crosslinked polyethylene material.

5. The tubing/fitting connection according to claim 1, wherein the retainer seals the tubing to the fitting portion.

6. The tubing/fitting connection according to claim 1, wherein the clamp exerts a force which squeezes the tubing between the fitting portion and the retainer.

7. The tubing/fitting connection according to claim 6, wherein the retainer internally supports the tubing against the force exerted by the clamp.

8. The tubing/fitting connection according to claim 1, wherein the clamp squeezes the fitting portion about the tubing, and the retainer internally supports the tubing.

9. The tubing/fitting connection according to claim 1, wherein the retainer includes a sleeve inserted into the tubing and internally gripping the tubing.

10. The tubing/fitting connection according to claim 9, wherein the sleeve includes multiple gripping projections comprising flaps cut from the sleeve and bent outward to internally engage the tubing.

11. The tubing/fitting connection according to claim 9, wherein the sleeve includes at least one gripping ring formed externally about the sleeve, the ring internally engaging the tubing.

12. The tubing/fitting connection according to claim 11, wherein the ring is circumferentially continuous about the sleeve.

13. The tubing/fitting connection according to claim 11, wherein the ring is formed by cutting material from an exterior of the sleeve.

14. The tubing/fitting connection according to claim 11, wherein the ring is formed by swaging the sleeve outward.

15. The tubing/fitting connection according to claim 1, wherein the retainer includes a portion inserted into the fitting and internally gripping the fitting.

16. The tubing/fitting connection according to claim 15, wherein the retainer portion includes multiple gripping projections comprising flaps cut from the retainer portion and bent outward to internally engage the fitting.

17. The tubing/fitting connection according to claim 15, wherein the retainer portion includes at least one gripping ring formed externally about the retainer portion, the ring internally engaging the fitting.

18. The tubing/fitting connection according to claim 17, wherein the ring is circumferentially continuous about the retainer portion.

19. The tubing/fitting connection according to claim 17, wherein the ring is formed by cutting material from an exterior of the retainer portion.

20. The tubing/fitting connection according to claim 17, wherein the ring is formed by swaging the retainer portion outward.

21. The tubing/fitting connection according to claim 1, wherein the retainer is constructed of multiple members, at least one of the members gripping the fitting portion and another of the members gripping the tubing.

22. The tubing/fitting connection according to claim 1, wherein the fitting portion includes a recess which receives the retainer therein.

23. The tubing/fitting connection according to claim 22, wherein the recess is radially enlarged and internally formed on the fitting portion.

24. A method of connecting a tubing made of flexible material to a fitting, the method comprising the steps of:
inserting a retainer into the flexible tubing;
internally gripping the tubing with at least one first gripping structure of the retainer;
internally supporting the tubing with a cylindrical portion of the retainer;
inserting the tubing into the fitting;
internally gripping the fitting with at least one second gripping structure of the retainer; and
tightening a clamp about the fitting, thereby both increasing the internal gripping of the tubing by the first gripping structure and increasing the internal gripping of the fitting by the second gripping structure.

25. The method according to claim 24, wherein the step of inserting the retainer into the tubing is performed before the step of inserting the tubing into the fitting.

26. The method according to claim 24, wherein the step of internally gripping the tubing is performed before the step of internally gripping the fitting.

27. The method according to claim 24, wherein in the step of internally gripping the tubing, the first gripping structure is formed on a member separate from the second gripping structure in the step of internally gripping the fitting.

28. The method according to claim 24, wherein the step of internally gripping the tubing further comprises sealing the retainer to the tubing.

29. The method according to claim 28, wherein the step of internally gripping the fitting further comprises sealing the retainer to the fitting.

30. The method according to claim 24, wherein the step of tightening the clamp further comprises clamping the fitting about the tubing after the step of inserting the tubing into the fitting.

31. The method according to claim 30, wherein the clamping step further comprises sealing the fitting to the tubing.

32. The method according to claim 24, wherein in the step of internally gripping the fitting, the fitting is made of flexible material.

33. The method according to claim 32, wherein the fitting is made of a crosslinked polyethylene material.

34. The method according to claim 24, wherein in the retainer inserting step, the tubing is made of a crosslinked polyethylene material.

* * * * *